April 14, 1931.  C. F. NOFTZGER ET AL  1,800,314

MIXING AND MEASURING VALVE MECHANISM

Filed Aug. 24, 1928  3 Sheets-Sheet 1

INVENTOR
Charles F. Noftzger
Nicholas L. Etter
BY
Chappell Earl
ATTORNEYS

April 14, 1931.   C. F. NOFTZGER ET AL   1,800,314
MIXING AND MEASURING VALVE MECHANISM
Filed Aug. 24, 1928   3 Sheets-Sheet 2

INVENTOR
Charles F. Noftzger
Nicholas L. Etten
BY
Chappell Earl
ATTORNEYS

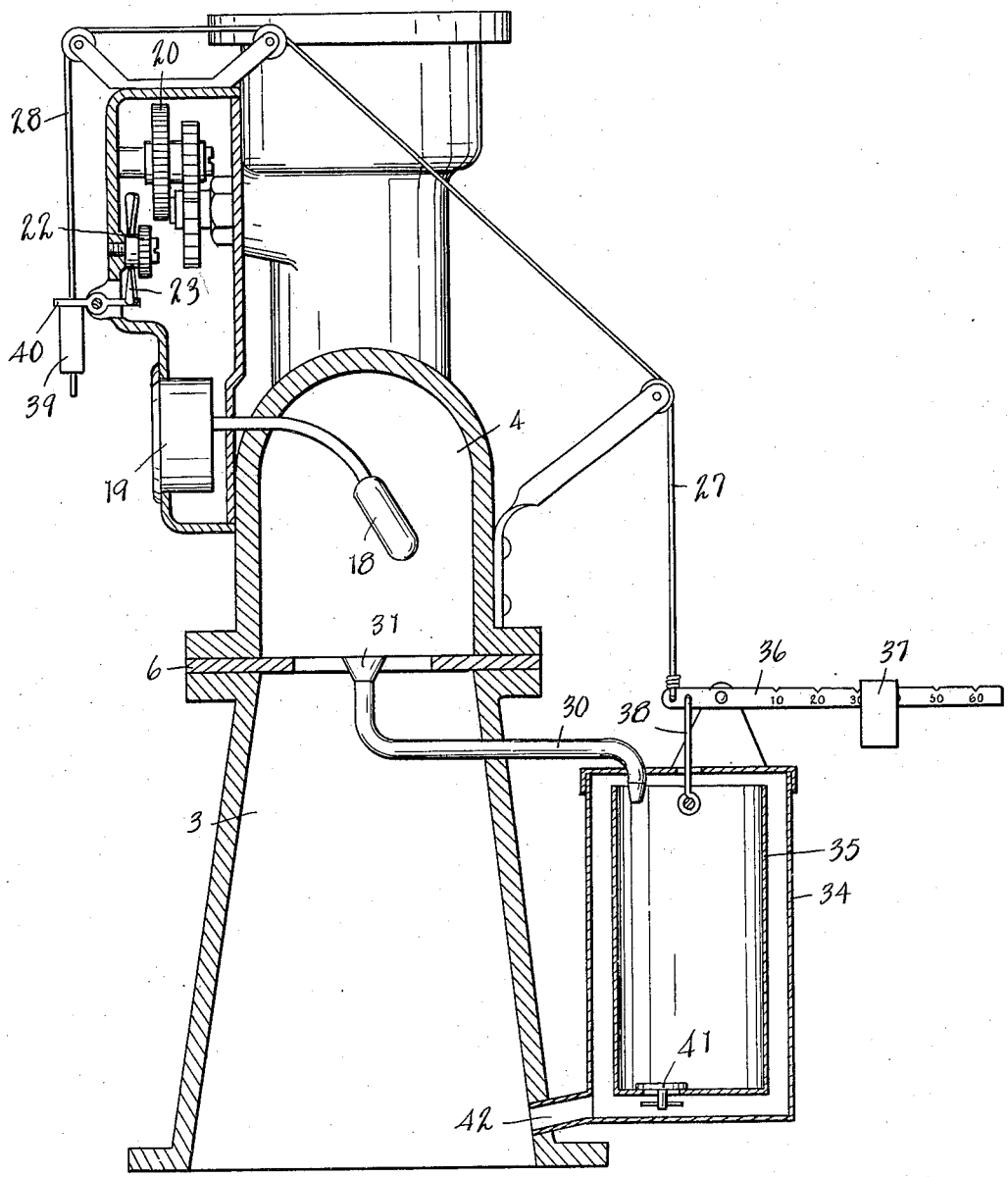

Patented Apr. 14, 1931

1,800,314

UNITED STATES PATENT OFFICE

CHARLES F. NOFTZGER AND NICHOLAS L. ETTEN, OF CHICAGO, ILLINOIS; SAID ETTEN ASSIGNOR TO SAID NOFTZGER

MIXING AND MEASURING VALVE MECHANISM

Application filed August 24, 1928. Serial No. 301,770.

The main objects of this invention:

First, to provide a mixing and measuring valve for use in laundries and in other relations where relatively large quantities of water are handled, which is of large capacity and substantially accurate.

Second, to provide a structure having these advantages which is easily manipulated by an unskilled workman.

Third, to provide a structure having these advantages which is not likely to become inoperative.

Objects pertaining to details and economies of our invention will appear from the description to follow. The invention is defined in the claims.

A structure which embodies the features of our invention is illustrated in the accompanying drawing, in which:

Fig. 6 is a view partially in vertical section of a modified form or embodiment of our invention, the modification being primarily in the water actuated means for controlling the valves.

Figure 1:
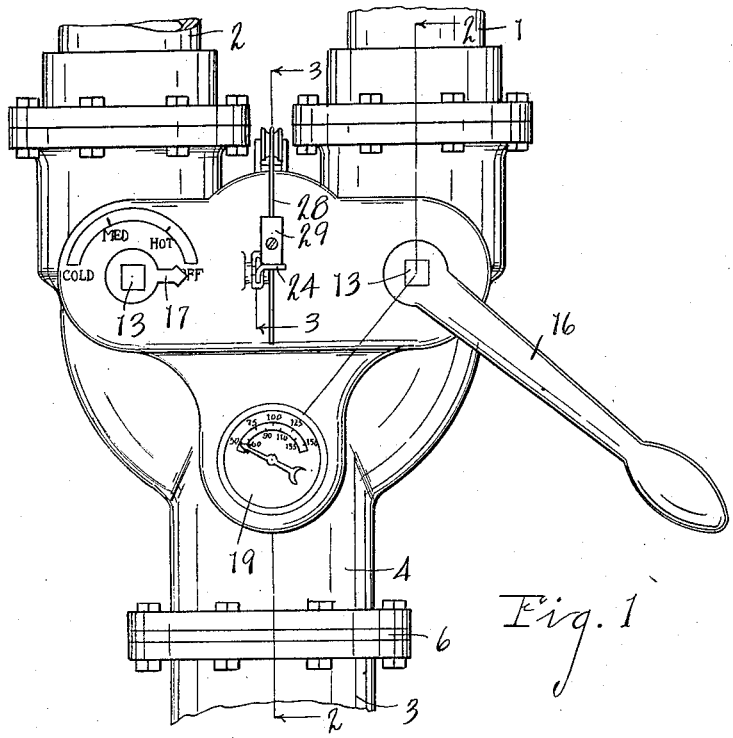
Fig. 1 is a front elevation of our improved mixing and measuring valve mechanism, the supplying pipes and the discharge pipe being broken away.
Figure 4:
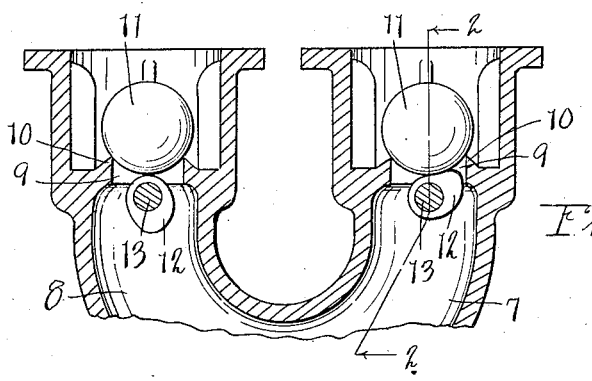
Fig. 4 is a detail view mainly in section on line 4—4 of Figs. 2 and 3.
Figure 5:
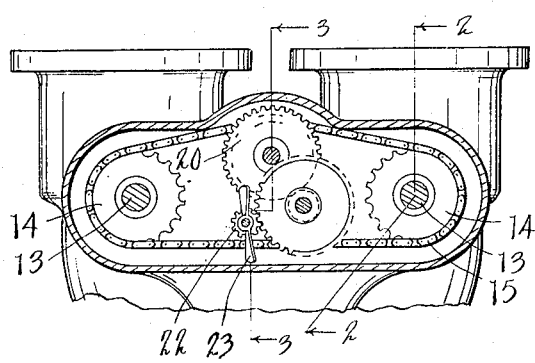
Fig. 5 is a detail section on line 5—5 of Figs. 2 and 3.

Referring to the drawing, 1 and 2 represent the supply pipes and 3 the discharge pipe. The mixing chamber 4 delivers to the discharge pipe 3 through a central discharge opening 5 formed in a plate 6 interposed between the bottom of the chamber and the upper end of the discharge pipe 3. The purpose of this plate is to provide a convenient means of securing a discharge opening for the mixing chamber of the proper size.

The mixing chamber is provided with inlet passages 7 and 8 provided with ports 9 having upwardly facing valve seats 10 for the ball valves 11. The supply pipes 1 and 2 are connected to the mixing chamber through these valves. It is clear that it would be immaterial which was employed for hot and cold water so we do not particularly designate them here as hot and cold water pipes.

The valves are opened by means of cams 12 which are mounted on spindles 13 in proper relation so that while the valves may be simultaneously opened they are opened at different degrees. These spindles are provided with sprockets 14 connected by the sprocket chain 15. The handle 16 on one of the spindles is weighted to act as a closing member.

The other spindle is provided with an index finger 17 having index indicia operatively associated therewith as in Fig. 1, the words "Cold", "Med." (for medium), "Hot" and "Off" being indicated. The valve is closed when the indicator points to "Off".

Figure 2:
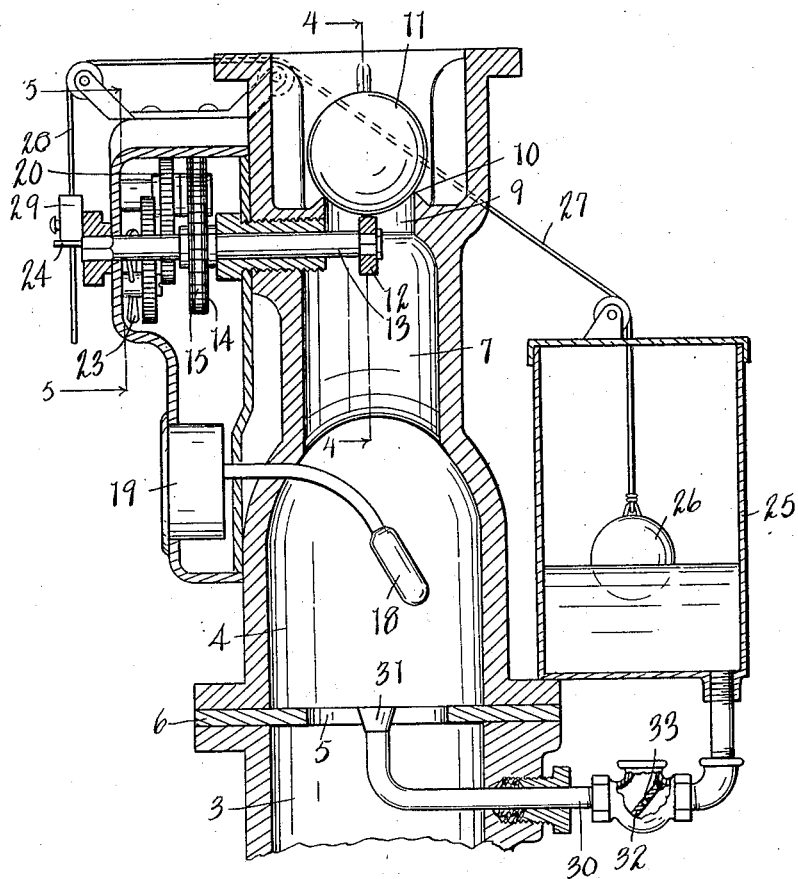
Fig. 2 is a detail view mainly in vertical section on a line corresponding to the broken line 2—2 of Figs. 1, 4 and 5.
Figure 3:
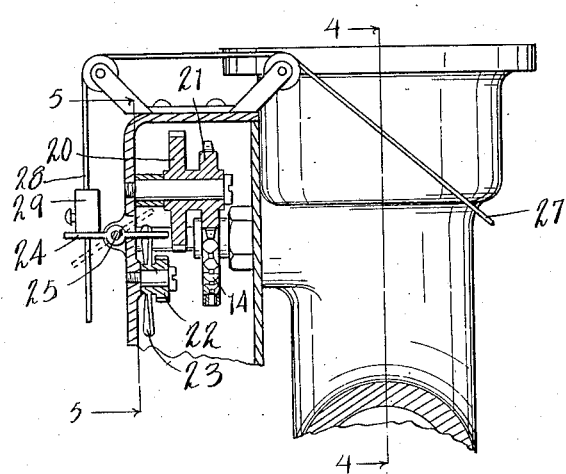
Fig. 3 is a detail view mainly in vertical section on a line corresponding to line 3—3 of Figs. 1 and 5.

It will be observed that with the parts arranged as in Figs. 1 and 2 the lifting of the handle 16 would first open the hot water valve, the cold water valve beginning to open after the point indicated by the word "Hot" has been passed.

A thermometer is provided with the bulb 18 arranged in the mixing chamber 4 to be subject to the water flowing thereunder. This thermometer is of the dial type with the dial 19 arranged at the front of the mechanism so that the operator may adjust the valve in accordance with the temperature indicated.

The valves are held in their adjusted positions and their closing controlled by a mechanism which, in the embodiment illustrated, consists in a train of gears designated generally by the numeral 20, one of which namely the gear 21, coacts with the sprocket chain 15. A pinion 22 connected to this train of gears is provided with a fan 23 which serves as a governor so that the valves are gradually controlled, thus preventing hammering and injury to the mechanism. A detent 24 pivoted at 25 to be swung into engagement with the blade of the fan is provided. The valves are thus held in their adjusted positions.

To release this detent after the passage of a predetermined quantity of water, we provide a water actuated control means which, in the embodiment illustrated in Fig. 2, consists of a float chamber 125 and coacting float 26. This float is provided with a cable 27 passing over suitable guide pulleys so that its outer end 28 depends vertically at the front of the machine. On this depending end of the cable we mount a tappet or trip member 29 adapted to engage the detent 24 when the float rises to the predetermined position which is determined by the position of the trip member 29 on the cable 27; that is, the trip member may be adjusted on the cable thereby regulating the amount of water necessary to be accumulated in the float chamber in order to release the detent.

The float actuating water is supplied to the float chamber through a conduit 30 which has a funnel-shaped intake 31 disposed centrally within the discharge of the mixing chamber. A check valve 32 is arranged in this conduit, the check valve having a small port 33 therein permitting a restricted flow of water to the float chamber while permitting a quick discharge of the float chamber when the flow of water ceases.

In the embodiment shown in Fig. 6, the water actuated means is modified, a tank 34 being provided for the balanced bucket 35 which is carried by a beam 36 having a weight 37 adjustable thereon. The balanced bucket is supported from the short arm of this lever by means of a link 38, a cable 27 being connected to the lever. The trip 39 is arranged to engage the detent 40 corresponding to the detent 24 on the upward movement of the trip member, that is, when the bucket 31 lowered by water collecting therein reaches a predetermined point, the detent is released. A valve 41 is provided at the bottom of the bucket and adapted to be opened by the lowering of the bucket. The chamber 34 has a discharge 42.

Our improved valve mechanism is easily manipulated to secure desired predetermined temperatures in the water discharged and is accurate in measuring the same.

We have illustrated and described our improvements in an embodiment which we consider very practical. We have not attempted to illustrate or describe certain other embodiments or adaptations as we believe this disclosure will enable those skilled in the art to embody or adapt our improvements as may be desired.

Having thus described our invention, what we claim as new and desire to secure by Letters Patent, is:

1. In a valve mechanism, the combination of a mixing chamber provided with a discharge opening and with hot and cold water inlet ports having upwardly facing valve seats, ball valves coacting with said seats, cams for opening said valves provided with spindles, operating connections for said spindles, a speed regulating valve closing control mechanism, a detent operatively associated with said control mechanism, a water actuated means including a movable element, a trip member actuated by said element and operatively associated with said detent, a conduit delivering to the said water actuated means and having an intake disposed centrally in the discharge of said mixing chamber, and a check valve disposed in said conduit to open towards its said intake, said check valve having a restricted port therein.

2. In a valve mechanism, the combination of a mixing chamber provided with a discharge opening and with hot and cold water inlet ports having upwardly facing valve seats, ball valves coacting with said seats, cams for opening said valves provided with spindles, operating connections for said spindles, a speed regulating valve closing control mechanism, a detent operatively associated with said control mechanism, a water actuated means, a trip member actuated by said water actuated means and operatively associated with said detent, and a conduit delivering to said water actuated means and having an intake disposed centrally in the discharge of said mixing chamber.

3. In a valve mechanism, the combination of a mixing chamber provided with a discharge opening and with hot and cold water inlet ports having upwardly facing valve seats, ball valves coacting with said seats, cams for opening said valves provided with spindles, a weighted handpiece on one of said spindles, an index member on the other spindle, operating connections for said spindles, a speed regulating valve closing control mechanism, a detent operatively associated with said control mechanism, a water actuated means, a trip member actuated by said water actuated means and operatively associated with said detent, and a conduit delivering to said water actuated means and having an intake disposed centrally in the discharge of said mixing chamber.

4. In a valve mechanism, the combination of a mixing chamber, a plurality of inlet valves of the ball type, cams operatively associated with said valves for lifting them from their seats and provided with spindles having sprockets thereon, a sprocket chain connecting said spindles, a weighted handle on one of said spindles, an index member on the other spindles, a speed regulating valve closing control mechanism comprising a train of gears, one of which is operatively associated with said sprocket chain, a fan operatively associated with said train of gears, a detent for said control mechanism, a water actuated means, a trip member operatively connected with said float to coact with said detent, and a conduit delivering to said water actuated means and provided with an intake disposed in the path of the water discharged by said valves.

5. In a valve mechanism, the combination of a plurality of valves, cams operatively associated with said valves for lifting them from their seats and provided with spindles having sprockets therein, a sprocket chain connecting said spindles, a weighted handle on one of said spindles, an index member on the other spindle, a speed regulating valve closing control mechanism comprising a train of gears, one of which is operatively associated with said sprocket chain, a fan operatively associated with said train of gears, a detent coacting with said control mechanism, and means for automatically actuating said detent controlled by the water discharged.

6. In a valve mechanism, the combination of a mixing chamber provided with a discharge opening and with hot and cold water inlet ports having upwardly facing valve seats, ball valves coacting with said seats, cams for opening said valves provided with spindles, an automatic valve closing mechanism operatively connected to both spindles, means for simultaneously operating said spindles manually to open the valves, a water actuated means including a movable element, a trip for said valve closing mechanism operatively connected to said movable element to be actuated thereby, and a conduit delivering to said water actuated means and having an intake disposed in the discharge of said mixing chamber.

7. In a valve mechanism, the combination of a mixing chamber provided with hot and cold water inlet valves, operating connections for said valves, a valve control detent, a water actuated means operatively associated with said detent, a conduit delivering to the said water actuated means and having an intake disposed in the discharge of said mixing chamber, said float chamber conduit being provided with an intake check valve, and an intake by-pass for said valve.

8. In a valve mechanism, the combination with hot and cold water inlet valves having a common discharge, said valves being operatively connected, a valve control means, a water actuated means operatively associated with said control means, a conduit delivering to said water actuated means and provided with an intake disposed in the discharge of said valves, an intake check valve for said conduit, and an intake by-pass for said valve chamber.

9. In a valve mechanism, the combination with hot and cold water inlet valves having a common discharge, said valves being operatively connected, a valve control means, a water actuated means operatively associated with said valve control means, a conduit delivering to said water actuated means and provided with an intake disposed in the discharge of said valves, and a check valve for said conduit permitting free discharge of the water.

10. In a mechanism of the class described, the combination with a supply valve, a control mechanism for said valve, a fluid actuated means operatively associated with said control mechanism, and a conduit delivering to said fluid actuated means and provided with an intake disposed in the path of the discharge of said valve, said conduit being provided with a check valve providing restricted inflow and free outflow.

In witness whereof we have hereunto set our hands.

CHARLES F. NOFTZGER.
NICHOLAS L. ETTEN.